US012679350B2

(12) United States Patent
Takahashi

(10) Patent No.: US 12,679,350 B2
(45) Date of Patent: Jul. 14, 2026

(54) VEHICLE CONTROL DEVICE AND VEHICLE CONTROL METHOD

(71) Applicant: TOYOTA JIDOSHA KABUSHIKI KAISHA, Toyota (JP)

(72) Inventor: Kentaro Takahashi, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/886,477

(22) Filed: Sep. 16, 2024

(65) Prior Publication Data

US 2025/0153710 A1     May 15, 2025

(30) Foreign Application Priority Data

Nov. 15, 2023     (JP) ................................. 2023-194369

(51) Int. Cl.
B60W 30/09        (2012.01)
B60W 30/16        (2020.01)

(52) U.S. Cl.
CPC ............ B60W 30/09 (2013.01); B60W 30/16 (2013.01); *B60W 2520/105* (2013.01); *B60W 2554/801* (2020.02)

(58) Field of Classification Search
CPC .................. B60W 30/09; B60W 30/16; B60W 2520/105; B60W 2554/801; B60W 2554/802; B60W 2720/106; B60W 30/12; B60W 30/18163; B60W 10/04; B60W 10/18; B60W 10/20; B60W 40/04; B60W 2420/403; B60W 2420/408; B60W 2520/10; B60W 2540/10; B60W 2540/12; B60W 2540/18; B60W 2554/4041; B60W 2554/4042; B60W 2554/4043
USPC .......................................................... 701/70
See application file for complete search history.

(56) References Cited

U.S. PATENT DOCUMENTS

| | | | |
|---|---|---|---|
| 7,692,534 B2 | 4/2010 | Kataoka et al. |
| 8,352,124 B2 | 1/2013 | Taguchi |
| 8,682,500 B2 | 3/2014 | Sakugawa |
| 8,818,634 B2 | 8/2014 | Fujita et al. |
| 9,168,953 B2 | 10/2015 | Mitsumoto et al. |
| 9,714,034 B2 | 7/2017 | Otake et al. |
| 9,880,558 B2 | 1/2018 | Nakamura |
| 9,902,399 B2 | 2/2018 | Torii et al. |

(Continued)

FOREIGN PATENT DOCUMENTS

JP          2019-123402 A        7/2019

*Primary Examiner* — Scott A Reinbold
(74) *Attorney, Agent, or Firm* — Sughrue Mion, PLLC

(57)        ABSTRACT

To prevent the occupants of a vehicle from feeling uneasy by offset, provided is a control device configured to control the travel of the vehicle so that a lateral position of the vehicle is maintained a target lateral position. The control device comprising a longitudinal control unit configured to execute, when detect a front object in an adjacent area and an approaching vehicle in an adjacent lane, controlling a longitudinal acceleration or a longitudinal deceleration of the vehicle, so that a first timing and a second timing is different from each other, and a lateral control unit configured to control a lateral speed of the vehicle so that the lateral direction position of the vehicle at the first timing is laterally separated from the front object and the lateral direction position of the vehicle at the second timing is laterally separated from the approaching vehicle.

2 Claims, 9 Drawing Sheets

(56)         References Cited

U.S. PATENT DOCUMENTS

| | | | | |
|---|---|---|---|---|
| 10,345,443 | B2 | 7/2019 | Masui et al. | |
| 10,611,240 | B2 | 4/2020 | Masui et al. | |
| 2016/0194003 | A1* | 7/2016 | Torii ................. | B60W 60/0053 |
| | | | | 701/23 |
| 2019/0217883 | A1* | 7/2019 | Ozawa ................... | B62D 6/002 |
| 2023/0234573 | A1* | 7/2023 | Iwase ................ | B60W 30/0956 |
| | | | | 701/26 |

* cited by examiner

VEHICLE CONTROL DEVICE AND VEHICLE CONTROL METHOD

CROSS-REFERENCE TO RELATED APPLICATION

This application claims priority to Japanese Patent Application No. JP2023-194369 filed on Nov. 15, 2023, the content of which is hereby incorporated by reference in its entirety into this application.

BACKGROUND OF THE INVENTION

1. Field of the Invention

The present disclosure relates to a vehicle control device and a vehicle control method.

2. Description of the Related Art

An offset control is known which ensure distance between an own vehicle and a preceding vehicle by offsetting lateral position of the own vehicle from center of an own lane in a direction opposite against to the preceding vehicle, when the own vehicle detects the preceding vehicle whose vehicle speed is slower than that of the own vehicle approaching the own vehicle in an adjacent lane adjacent to the owe lane.

For example, Japanese Patent Application Laid-Open (kokai) No. 2019-123402 discloses a device in which, when a preceding vehicle traveling on a first adjacent lane and a following vehicle traveling on a second adjacent lane adjacent to a side opposite to the first adjacent lane are detected, execute of offset control for the preceding vehicle is prohibited or the offset control being executed is cancelled.

In the device described in above Patent Application, when the offset control is canceled by detecting the following vehicle approaching toward the own vehicle in the second adjacent lane, the own vehicle is uniformly moved lateral toward the center of the own lane regardless of the positional relationship of the preceding vehicle and the following vehicle with the own vehicle. For this reason, depending on the timing at which the offset control is canceled, the own vehicle may behave in such a way that the own vehicle approaches the preceding vehicle that was the target of the offset control, which may cause a sense of uneasiness to the occupants of the own vehicle.

SUMMARY OF THE INVENTION

It is an object of the present disclosure to effectively prevent the occupants of the own vehicle from feeling uneasy by offset control.

A device according to at least one embodiment of the present disclosure is a vehicle control device. The vehicle control device configured to control the travel of an own vehicle so that a lateral position of the own vehicle is maintained a predetermined target lateral position set in an own lane. The vehicle control device comprising a longitudinal movement control unit configured to execute, when a front object approaching the own vehicle in an adjacent area adjacent to the own lane and an approaching vehicle in an adjacent lane adjacent to the own lane on the opposite side of the adjacent area are detected, controlling a longitudinal acceleration or a longitudinal deceleration of the own vehicle based on a relationship between the own vehicle and the front object and a relationship between the own vehicle and the approaching vehicle, so that a first timing which is an overtaking timing of the own vehicle and the front object and a second timing which is an overtaking timing of the own vehicle and the approaching vehicle is different from each other, and a lateral movement control unit configured to control a lateral speed of the own vehicle so that the lateral direction position of the own vehicle at the first timing is offset to a target lateral position laterally separated from the front object in the own lane and the lateral direction position of the own vehicle at the second timing is offset to the target lateral position laterally separated from the approaching vehicle in the own lane.

DESCRIPTION OF THE EMBODIMENTS

Description is now given of a vehicle control device and a vehicle control method according to at least one embodiment of the present disclosure with reference to the drawings.

[Hardware Configuration]

Figure 1A:
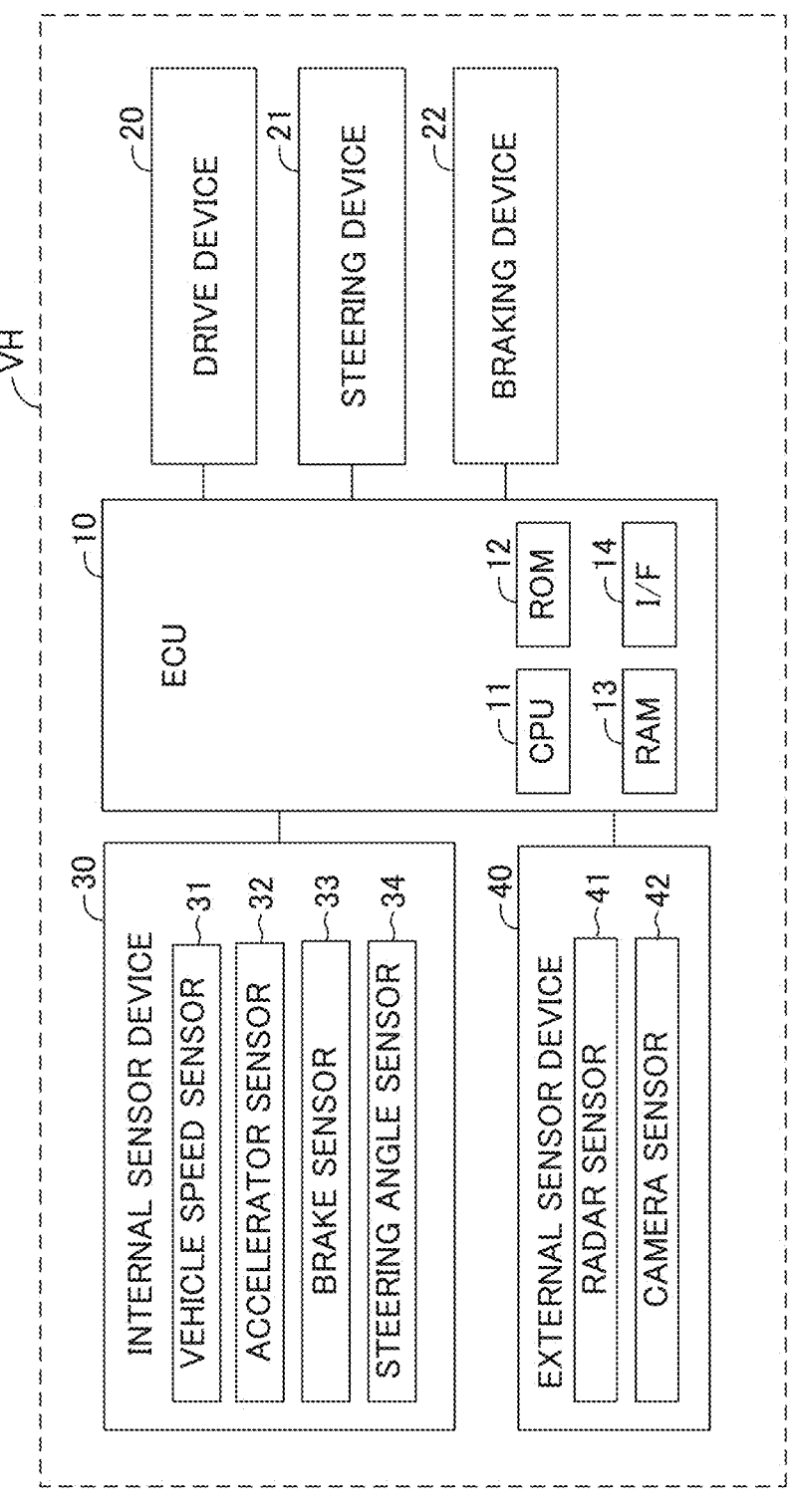
FIG. 1A is a schematic diagram showing a hardware configuration of a vehicle to which a control device according to the present embodiment is applied.

FIG. 1A is a schematic diagram of a hardware configuration of a vehicle VH to which the control device according to the present embodiment is applied. Hereinafter, the vehicle VH may be referred to as an own vehicle when it is required to distinguish it from other vehicles.

The vehicle VH has an ECU (Electronic Control Unit) 10. The ECU 10 includes a CPU (Central Processing Unit) 11, ROM (Read Only Memory) 12, RAM (Random Access Memory) 13, an interface device 14, and the like. The CPU 11 executes various programs stored in the ROM 12. The ROM 12 is a non-volatile memory that stores data and the like required for the CPU 11 to execute various programs. The RAM 13 is a volatile memory to provide a working region that is deployed when various programs are executed by the CPU 11. The interface device 14 is a communication device for communicating with an external device.

The ECU 10 is a central device which executes driving assist control of the vehicle VH, such as an offset control (Vehicle Lateral Offset: VLO), tracking inter-vehicle distance control (Adaptive Cruise Control: ACC) and lane keeping assist control (Lane Trace Asist: LTA). The driving assist control is a concept which encompasses automatic driving control. A drive device 20, a steering device 21, a braking device 22, an internal sensor device 30, an external sensor device 40, and the like are communicably connected to the ECU 10.

The drive device 20 generates a driving force to be transmitted to driving wheels of the vehicle VH. The steering device 21 applies steering forces to steerable wheels of the vehicle VH. The braking device 22 applies a braking force to the wheels of the vehicle VH.

The internal sensor device 30 is sensors which acquire states of the vehicle VH. Specifically, the internal sensor device 30 includes a vehicle speed sensor 31, an accelerator sensor 32, a brake sensor 33, a steering angle sensor 34, and the like.

The vehicle speed sensor 31 detects a travel speed (vehicle speed v) of the vehicle VH. The accelerator sensor 32 detects an operation amount of an accelerator pedal (not shown) by the driver. The brake sensor 33 detects an operation amount of a brake pedal (not shown) by the driver. The steering angle sensor 34 detects a rotational angle of a steering wheel or a steering shaft (not shown) of the vehicle VH, that is, a steering angle. The internal sensor device 30 transmits the condition of the vehicle VH detected by the sensors 31 to 34 to the ECU 10 at a predetermined cycle.

The external sensor device 40 is sensors which acquire object information on objects around the vehicle VH. Specifically, the periphery recognition device 40 includes a radar sensor 41, a camera sensor 42, and the like. As the object information, there are given, for example, a peripheral vehicle, a pedestrian, a white line of a road, a fallen object, a stationary structure, and the like.

The radar sensor 41 is provided in, for example, a front portion of the vehicle VH, and detects a target existing in a region located on the front side of the vehicle VH. The radar sensor 41 includes a millimeter wave radar or Lidar. The millimeter wave radar radiates a radio wave (millimeter wave) in a millimeter wave band, and receives the millimeter wave (reflected wave) reflected by a target existing within a radiation range. The millimeter wave radar acquires a relative distance between the vehicle VH and the target, a relative speed between the vehicle VH and the target, and the like based on a phase difference between the transmitted millimeter wave and the received reflected wave, an attenuation level of the reflected wave, a time from the transmission of the millimeter wave to the reception of the reflected wave, and the like. The Lidar sequentially scans laser light in a pulse form having a shorter wavelength than that of the millimeter wave in a plurality of directions, and receives reflected light reflected by a target, to thereby acquire a shape of the target detected in front of the vehicle VH, the relative distance between the vehicle VH and the target, the relative speed between the vehicle VH and the target, and the like.

The camera sensor 42 is, for example, a stereo camera or a monocular camera, and a digital camera including an image pickup element such as a CMOS sensor or a CCD sensor can be used as the camera sensor 42. The camera sensor 42 is arranged in, for example, a top portion of a front windshield glass of the vehicle VH. The camera sensor 42 captures a region in front of the vehicle VH, and processes captured image data, to thereby obtain the object information in front of the vehicle VH. The object information is information indicating a type of the target detected in front of the vehicle VH, the relative distance between the vehicle VH and the target, the relative speed between the vehicle VH and the target, and the like. It is only required to recognize the type of the target through, for example, machine learning such as pattern matching.

The external sensor device 40 repeatedly transmit the acquired object information to the ECU 10 each time a predetermined time elapses. The ECU 10 composes the relative relationship between the vehicle VH and the target acquired by the radar sensor 41 and the relative relationship between the vehicle VH and the target acquired by the camera sensor 42, to thereby determine a relative relationship between the vehicle VH and the target. It is not always required for the external sensor device 40 to include both of the radar sensor 41 and the camera sensor 42, and may include, for example, only the camera sensor 42.

[Software Configuration]

Figure 1B:
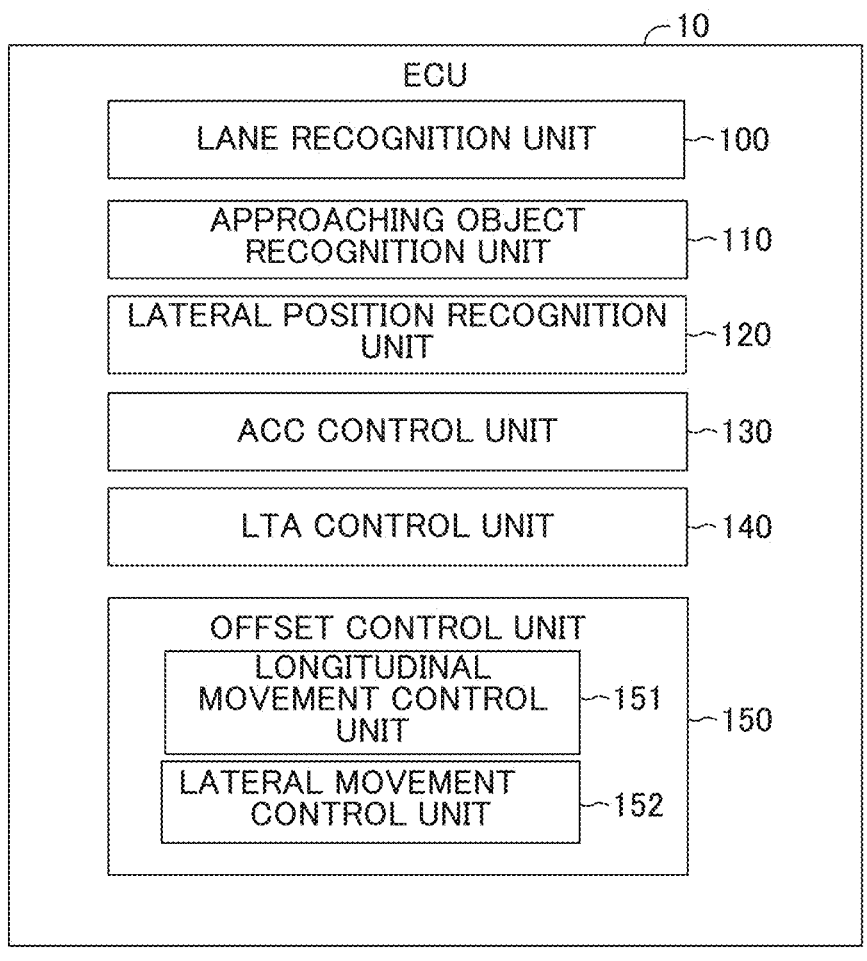
FIG. 1B is a schematic diagram showing a software configuration of a control device to the present embodiment.

FIG. 1B is a schematic diagram showing a software configuration of the ECU 10 to the present embodiment. As shown in FIG. 1B, the ECU 10 includes a lane recognition unit 100, an approaching object recognition unit 110, a lateral position recognition unit 120, an ACC control unit 130, a LTA control unit 140, an offset control unit 150, and the like as a part of functional elements. Those functional elements 100 to 150 are realized by the CPU 11 of the ECU 10 reading a program stored in the ROM 12 into the RAM 13 and executing the program. Note that all or a part of the functional elements 100 to 150 may be provided in another ECU separate from the ECU 10 or in an information processing device of a facility (a control center or the like) capable of communicating with the vehicle VH.

The lane recognizing unit 100 recognizes the lane in which the own vehicle VH is traveling (hereinafter referred to as the own lane) and the lane adjacent to the own lane (hereinafter referred to as the adjacent lane). For example, the lane recognizing unit 100 recognizes the border line of the own lane or the adjacent lane on the basis of images or the like of the surroundings of the own vehicle VH acquired by the external sensor device 40. Here, the boundary lines include not only white lines and yellow lines drawn on the road surface, but also curbstones, guardrails, and the like. The lane recognition unit 100 recognizes the own lane and the adjacent lane based on the recognized boundary line.

The approaching object recognition unit 110 recognizes whether the object approaching the own vehicle VH (hereinafter referred to as an approaching object) exists in the adjacent lane recognized by the lane recognition unit 100 or in an adjacent area such as a road shoulder adjacent to the own lane. Here, the approaching object includes a preceding vehicle whose vehicle speed is slower than that of the own vehicle VH, a following vehicle whose vehicle speed is faster than that of the own vehicle VH, and a stationary structural object such as a pylon or a temporary protection fence existing in front side direction of the own vehicle VH. The approaching object recognition unit 110 recognizes the distance and the relative speed between the own vehicle VH and the approaching object based on the detection result of the external sensor device 40. The distance is a distance in the traveling direction of the own vehicle VH. The relative speed is a speed that is a difference between the speed of the own vehicle VH in the traveling direction and the speed of the approaching target.

The lateral position recognizing unit 120 recognizes the lateral position of the own vehicle VH. Here, the lateral position of the own vehicle VH means the position of the own vehicle VH in the own lane in the lane width direction within the own lane. In the following description, the lane widthwise direction is referred to as a lateral direction, and the traveling direction of the own vehicle VH perpendicular to the lateral direction is referred to as a longitudinal direction. The lateral position recognition unit 120 recognizes the lateral position of the own vehicle VH in the own lane based on the position of the own vehicle VH with respect to the borderline of the own lane recognized by the lane recognition unit 100.

The ACC control unit 130 executes the ACC based on the target vehicle speed or the target inter-vehicle distance. The ACC itself is well known. Thus, a brief description is now given of the ACC. The ACC includes two types of control, namely, the constant-speed travel control and the follow-up travel control. The constant-speed travel control is control of causing the vehicle VH to travel at a constant speed in accordance with the target vehicle speed. The follow-up travel control is control of causing the vehicle VH to travel such that the vehicle VH follows the preceding vehicle traveling the own lane while maintaining the inter-vehicle distance to the preceding vehicle at the target inter-vehicle distance.

The ACC control unit 130 detects a following target vehicle to be tracked in front of the own vehicle VH in the own lane recognized by the lane recognition unit 100, based on the detection result of the external sensor device 40. When the following target vehicle does not exist, the ACC control unit 130 executes constant-speed travel control. In this case, the ACC control unit 130 calculates the target acceleration from the deviation between the vehicle speed V and the target vehicle speed, and controls the operation of the drive device 20 and the braking device 22 based on the calculated target acceleration. The vehicle speed V may be acquired based on the detection result of the vehicle speed sensor 31. On the other hand, when the following target vehicle is present in the own lane, the ACC control unit 130 executes the follow-up travel control. In this case, the ACC control unit 130 calculates the target acceleration from the deviation between the actual inter-vehicle distance and the target inter-vehicle distance, and controls the operation of the drive device 20 and the braking device 22 based on the calculated target acceleration. The actual inter-vehicle distance between the own vehicle VH and the following target vehicle may be acquired based on the detection result of the external sensor device 40.

The LTA control unit 140 executes the LTA for automatically changing the steering angle (steered wheel turning angle) so that a lateral position of the own vehicle VH is maintained at the target lateral position in the travel lane during activation of the ACC. The LTA itself is well known. Thus, a brief description is now given of the LTA. The LTA control unit 140 sets the target lateral position of the own vehicle VH based on the border line of the own lane recognized by the lane recognizing unit 100. The target lateral position is set, for example, substantially at the center in the lane width direction of the own lane. The LTA control unit 140 changes the steering angle of the vehicle VH by controlling the operation of the steering device 21 so that the lateral position of the vehicle VH is maintained near the target lateral position in the own lane.

The offset control unit 150 executes an offset process of offsetting the target lateral position used by LTA control unit 140 from the substantially center to the left or right side in the own lane, when the predetermined offset condition is satisfied. Hereinafter, a specific example of the offset process will be described with reference to FIG. 2A to 2C.

Figure 2A:
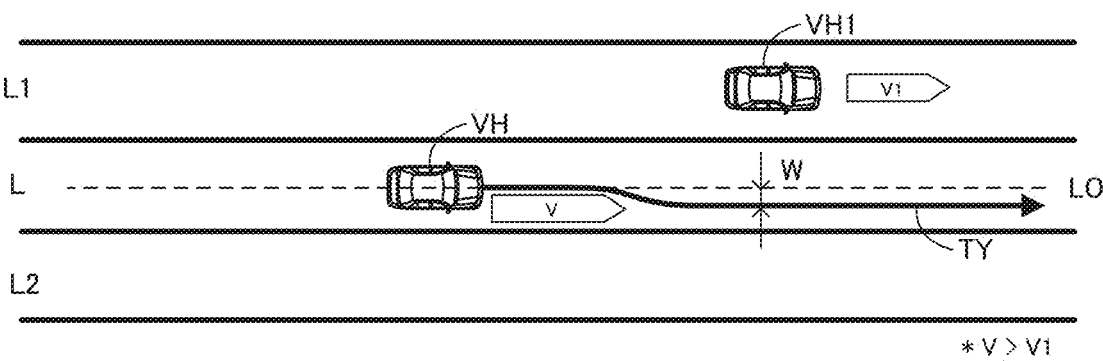
FIG. 2A is a schematic diagram for explaining an example of the offset control according to the present embodiment.

FIG. 2A shows an example of the offset process when the approaching object recognizing unit 110 detects a left preceding vehicle VH1 whose vehicle speed is slower than that of the own vehicle VH in the left adjacent lane L1 adjacent to the left side of the own lane L. The offset control unit 150 determines whether the offset condition is satisfied, when the approaching object recognizing unit 110 detects the left preceding vehicle VH1. Specifically, when the longitudinal distance between the own vehicle VH detected by the external sensor device 40 and the left preceding vehicle VH1 is equal to or less than a predetermined longitudinal threshold value and the lateral distance between the left preceding vehicle VH1 detected by the external sensor device 40 and the lane border line is equal to or less than a predetermined lateral threshold value, the offset control unit 150 determines that the offset condition is satisfied.

When the offset condition is satisfied, the offset control unit 150 generates a path plan for changing the target lateral position TY from the center L0 of the own lane L to a position shifted by a predetermined offset amount W in a direction (rightward direction) opposite to the left preceding vehicle VH1. When the pass plan is generated, the offset control unit 150 controls the activation of the steering device 21 so that the lateral position of the own vehicle VH is maintained in the vicinity of the target lateral position TY after the change. As a result, when the own vehicle VH overtakes the left preceding vehicle VH1, it is possible to secure a distance between the own vehicle VH and the left preceding vehicle VH1. When the offset condition becomes not satisfied, the offset control unit 150 terminates the offset control, that is, returns the target lateral position TY to the center LO of the own lane L.

In FIG. 2A, the example has been described that the left preceding vehicle VH1 which is slower than the vehicle speed of the own vehicle VH detected in the left adjacent lane L1, but the offset control unit 150 also executes the offset control when the approaching object recognizing unit 110 detects the right preceding vehicle VH1 slower than the own vehicle VH in the right adjacent lane L2. In this case, the target lateral position TY may be offset from the center L0 of the own lane L in a direction (leftward direction) opposite to the right preceding vehicle. Further, the control target of the offset process is not limited to the preceding vehicle whose vehicle speed is slower than that of the own vehicle VH, and may be, for example, a stationary structural object such as a pylon installed on a road shoulder or the like adjacent to the adjacent lane L1 and L2 or the own lane L.

Figure 2B:
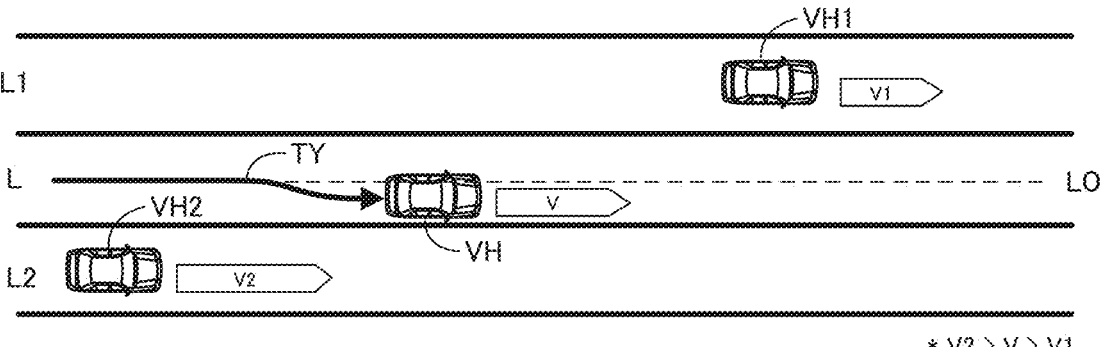
FIG. 2B is a schematic diagram for explaining an example of the offset control according to the present embodiment.

As shown in FIG. 2B, in a state in which the relation between the left preceding vehicle VH1 and the own vehicle VH satisfies the predetermined offset condition, the offset control unit 150 determines whether or not the predetermined cancellation condition is satisfied when the approaching object recognizing unit 110 detects the right following vehicle VH2 whose vehicle speed is faster than the own vehicle VH in the right adjacent lane L2. Specifically, the offset control unit 150 determines that the cancellation condition is satisfied when the inter vehicle distance between the right following vehicle VH2 and the own vehicle VH is equal to or less than the predetermined distance, or when TTC (Time to Collision) between the right following vehicle VH2 and the own vehicle VH is equal to or less than the predetermined time. TTC is a value obtained by dividing the distance between the right following vehicle VH2 and the own vehicle VH by the relative speed between the right following vehicle VH2 and the own vehicle VH.

The offset control unit 150 cancels the offset control when the relationship between the right following vehicle VH2 and the own vehicle VH satisfies the cancellation condition, even when the relationship between the left following vehicle VH1 and the own vehicle VH satisfies the offset condition. That is, when the cancel condition is satisfied before the start of the offset control, the offset control is not executed, and when the cancel condition is satisfied after the start of the offset control, the offset control is terminated.

Although the explanation based on the drawings is omitted, the offset control unit 150 cancels the offset control even when the relationship between the left following vehicle and the own vehicle VH satisfies the cancellation condition in a state where the relationship between the right preceding vehicle and the own vehicle VH satisfies the offset condition, or when the relationship between the following vehicle and the own vehicle VH on the other side of the stationary structure satisfies the cancellation condition in a state where the own vehicle VH and front side stationary structure satisfy the offset condition.

Figure 2C:
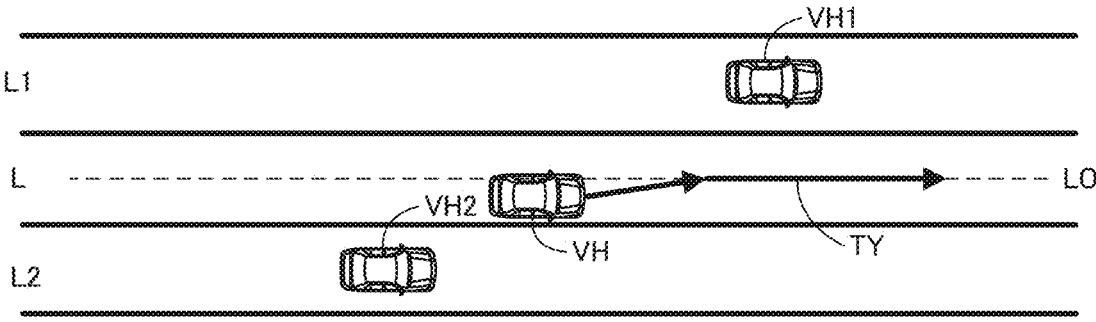
FIG. 2C is a schematic diagram for explaining an example of the offset control according to the present embodiment.

When the offset control is executed on the basis of a predetermined longitudinal speed or lateral speed, the own vehicle VH may approach the left preceding vehicle VH1 to which the offset is to be controlled, depending on the timing at which the cancellation condition is satisfied. FIG. 2C is a schematic diagram illustrating an example of such a vehicle behavior. Specifically, as shown in FIG. 2B, it is assumed that the offset control is cancelled when the own vehicle VH offsets the left preceding vehicle VH1 to the right side of the center L0 of the own lane L as the control target, and the relation between the right following vehicle VH2 and the own vehicle VH satisfies the cancellation criterion. In such a situation, if the offset control is cancelled without adjusting the lateral speed or the longitudinal speed, as shown in the FIG. 2C, when the own vehicle VH returns to the center L0 of the own lane L, there is a possibility that a vehicle behavior approaching the left preceding vehicle VH1 may cause an occupant of the own vehicle VH to feel uneasiness.

Therefore, in the present embodiment, when the right following vehicle VH2 is detected during the execution of the offset control against to the left preceding vehicle VH1 (or the stationary structure), the longitudinal speed and the lateral speed used for the offset control are appropriately adjusted based on the relationship between the right following vehicle VH2 and own vehicle VH and the relationship between the left preceding vehicle VH1 (or the stationary structure) and the own vehicle VH. Specifically, as shown in FIG. 1B, the offset control unit 150 includes a longitudinal movement control unit 151 that adjusts the longitudinal speed, and a lateral movement control unit 152 that adjusts the lateral speed. Details of processing executed by the longitudinal movement control unit 151 and the lateral movement control unit 152 will be described below. Note that the process when the own vehicle VH detects a left following vehicle while executing the offset control with the right preceding vehicle (or stationary structure) as the control target is only reversed from left to right, so the explanation is omitted.

Figure 3A:
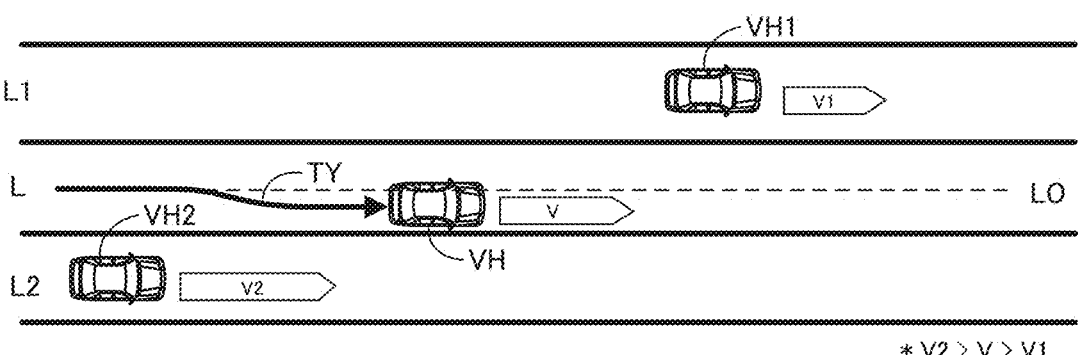
FIG. 3A is a schematic diagram for explaining an example of the offset control according to the present embodiment.

FIG. 3A shows an example of a case in which the right following vehicle VH2, whose speed is faster than that of the own vehicle VH, is detected and the relationship between the right following vehicle VH2 and the own vehicle VH satisfies the cancellation condition while the offset process is being executed with the left preceding vehicle VH1, whose speed is slower than the own vehicle VH, as the control target. That is, the vehicle speed V of the own vehicle VH is faster than the vehicle speed V1 of the left preceding vehicle VH1 and slower than the vehicle speed V2 of the right following vehicle VH2 (V2>V>V1).

In this case, the longitudinal movement control unit 151 determines whether or not the offset continuation allowable condition that allows the own vehicle VH to overtake the left preceding vehicle VH1 is satisfied before the own vehicle VH is overtaken by the right following vehicle VH2 if the own vehicle VH is accelerated (i.e., the longitudinal speed is increased) in the range equal to or less than the predetermined upper limit acceleration based on the inter-vehicle distance between the own vehicle VH and the left preceding vehicle VH1 and the inter-vehicle distance between the own vehicle VH and the right following vehicle VH2. The timing at which the own vehicle VH overtakes the left preceding vehicle VH1 is an example of the first timing of the present disclosure, and the timing at which the own vehicle VH is overtaken by the right following vehicle VH2 is an example of the second timing of the present disclosure.

Figure 3B:
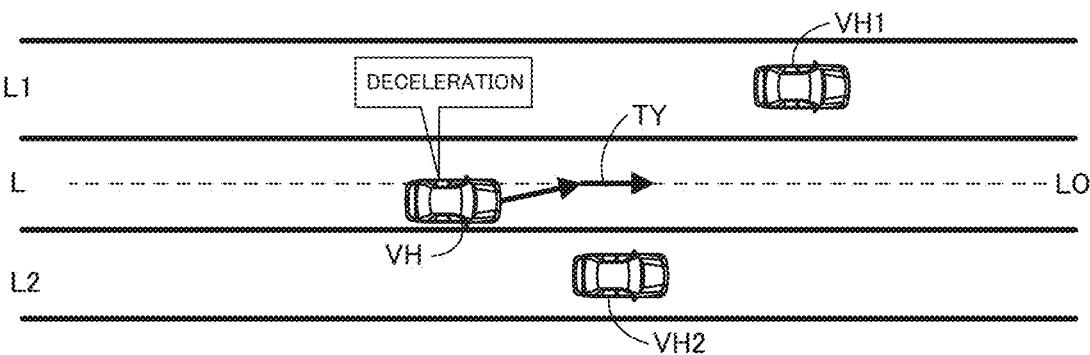
FIG. 3B is a schematic diagram for explaining an example of the offset control according to the present embodiment.

When the offset continuation allowable condition is not satisfied, the offset control unit 150 temporarily cancels the offset control by returning the lateral position of the own vehicle VH to the center L0 of the own lane L, as shown in FIG. 3B. At this time, the longitudinal movement control unit 151 reduces the longitudinal speed of the own vehicle VH, that is, decelerates the own vehicle VH in order to allow the right following vehicle VH2 overtakes the own vehicle VH. The deceleration for decelerating the own vehicle VH may be set to a faster deceleration as the vehicle speed of the right following vehicle VH2 is faster. In this case, the deceleration is set to be equal to or faster than a predetermined lower limit deceleration, in order to prevent a change in the longitudinal behavior of the own vehicle VH from becoming large.

Figure 3C:
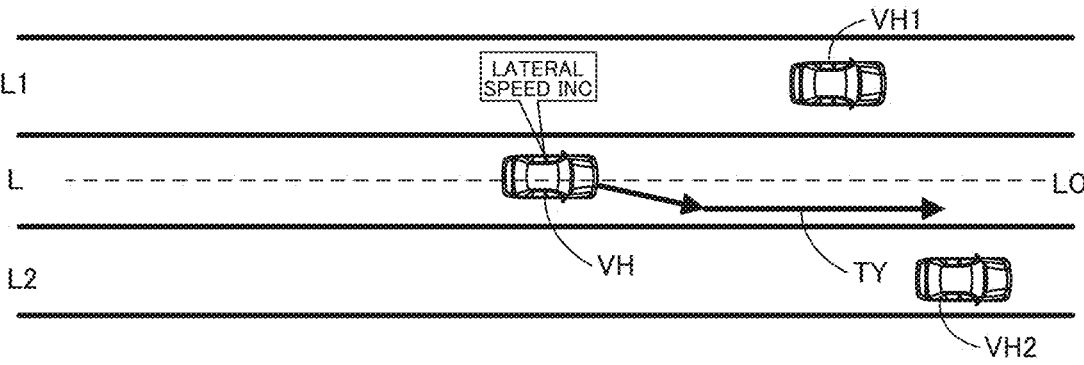
FIG. 3C is a schematic diagram for explaining an example of the offset control according to the present embodiment.

As shown in FIG. 3C, when the right following vehicle VH2 overtakes the own vehicle VH, the offset control unit 150 resumes the offset with the left preceding vehicle VH1 as the control target. At this time, the lateral movement control unit 152 increases the lateral speed of the offset control so that a sufficient lateral distance can be secured between the own vehicle VH and the left preceding vehicle VH1 prior to the own vehicle VH catching up to the left preceding vehicle VH1. In this case, the lateral speed is set to be equal to or lower than a predetermined upper limit lateral speed, in order to prevent a change in the lateral behavior of the own vehicle VH from becoming large.

Figure 4A:
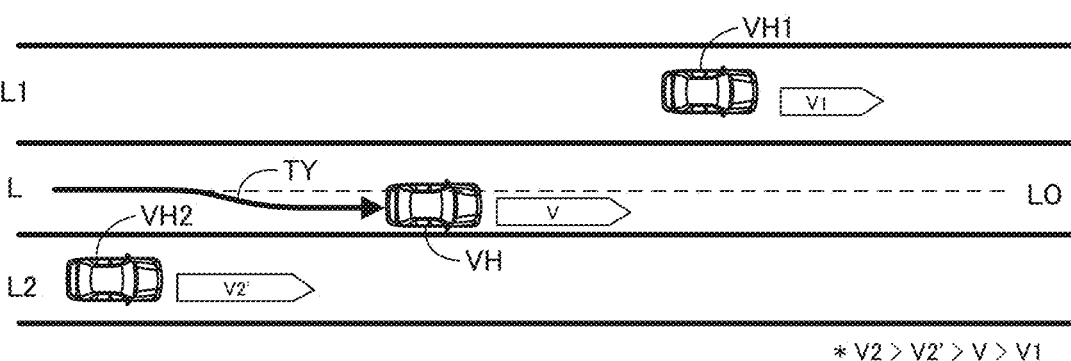
FIG. 4A is a schematic diagram for explaining an example of the offset control according to the present embodiment.

FIG. 4A shows an example when the offset continuation allowable condition is satisfied. Note that in state of FIG. 4A, the vehicle speed V2' of the right following vehicle VH2 is faster than the vehicle speed V of the own vehicle VH, but is slower than the vehicle speed V2 of the right following vehicle VH2 shown in FIG. 3A (V2>V2'>V>V1).

Figure 4B:
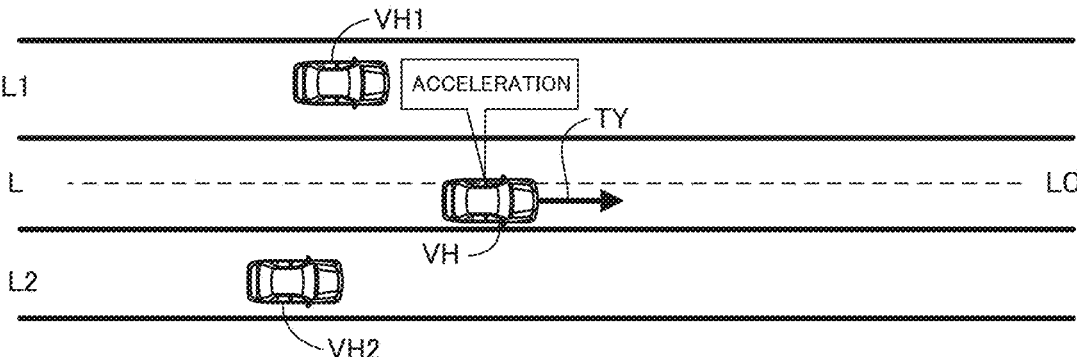
FIG. 4B is a schematic diagram for explaining an example of the offset control according to the present embodiment.

When the offset continuation allowable condition is satisfied, the offset control unit 150 continues the offset control as shown in FIG. 4B. At this time, the longitudinal movement control unit 151 increases the longitudinal speed of the own vehicle VH, that is, accelerates the own vehicle VH so as to overtake the left preceding vehicle VH1 prior to the own vehicle VH being caught up by the right following vehicle VH2. The acceleration for accelerating the own vehicle VH may be set to a faster acceleration as the vehicle speed of the right following vehicle VH2 increases. In this case, the acceleration is set to be equal to or less than a predetermined upper limit acceleration, in order to prevent a change in the longitudinal behavior of the own vehicle VH from becoming large.

Figure 4C:
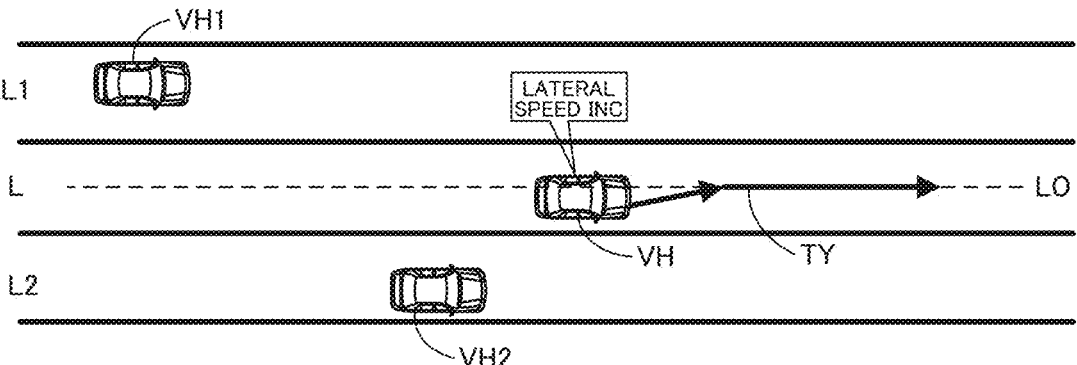
FIG. 4C is a schematic diagram for explaining an example of the offset control according to the present embodiment.

As shown in FIG. 4C, when the own vehicle VH overtakes the left preceding vehicle VH1, the offset control unit 150 returns the lateral position of the own vehicle VH to the center L0 of the own lane L. At this time, the lateral movement control unit 152 increases the lateral speed of the offset control so that the own vehicle VH can return to the center L0 of the own lane L prior to being overtaken by the right following vehicle VH2. In this case, the lateral speed is set to be equal to or lower than a predetermined upper limit lateral speed, in order to prevent a change in the lateral behavior of the own vehicle VH from becoming large.

Figure 5A:
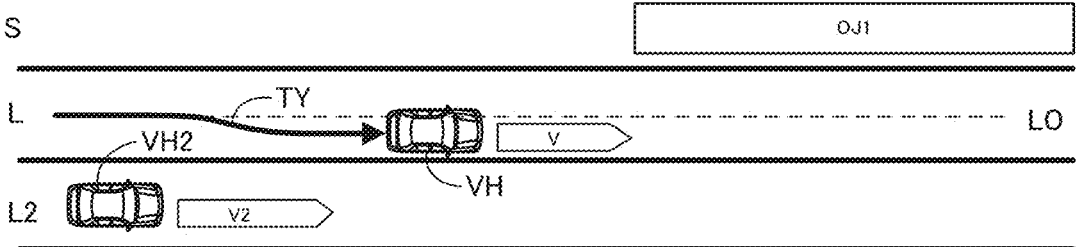
FIG. 5A is a schematic diagram for explaining an example of the offset control according to the present embodiment.

FIG. 5A shows an example of a case in which the right following vehicle VH2, which has a faster vehicle speed than the own vehicle VH, is detected and the relationship between the right following vehicle VH2 and the own vehicle VH satisfies the cancellation condition while the offset control is being executed against to a relatively long distance stationary structure OJ1 (an example of an adjacent area of the present disclosure) on the shoulder S adjacent to the left side of the own lane L. Examples of such the stationary structural OJ1 include a pylon and a temporary protection fence installed in association with a long section of roadway construction.

Figure 5B:
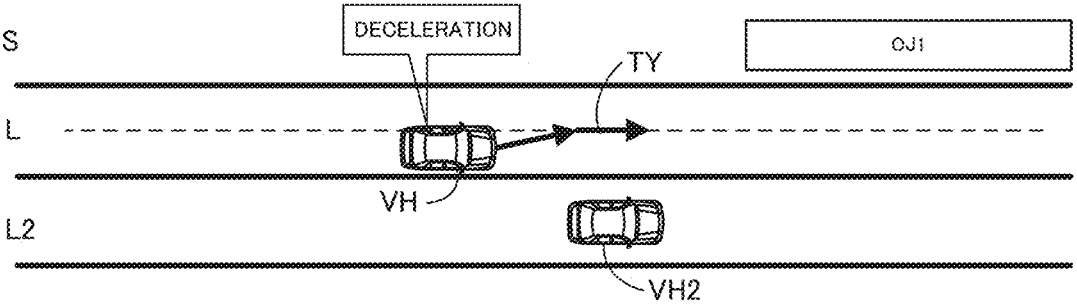
FIG. 5B is a schematic diagram for explaining an example of the offset control according to the present embodiment.
Figure 5C:
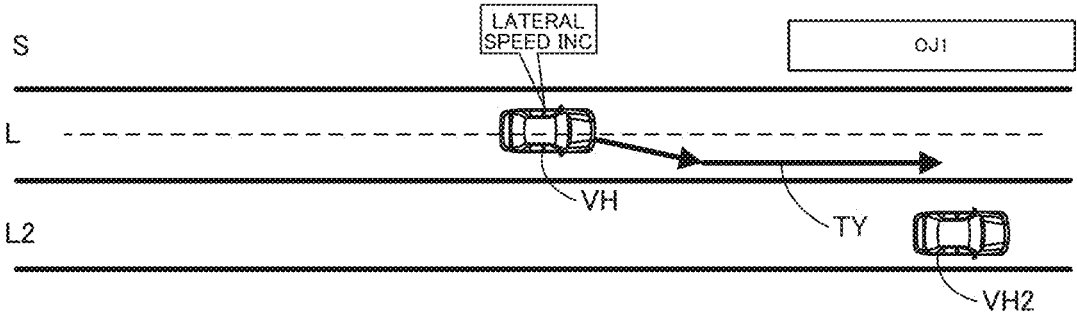
FIG. 5C is a schematic diagram for explaining an example of the offset control according to the present embodiment.

When the longitudinal distance of the stationary structural OJ1 is relatively long, the longitudinal movement control unit 151 determines that the offset continuation allowable condition is not satisfied. As shown in FIG. 5B, the offset control unit 150 temporarily cancels the offset control by returning the lateral position of the own vehicle VH to the center L0 of the own lane L. At this time, the longitudinal movement control unit 151 reduces the longitudinal speed of the own vehicle VH, that is, decelerates the own vehicle VH in order to allow the right following vehicle VH2 overtakes the own vehicle VH. As shown in FIG. 5C, when the right following vehicles VH2 overtake the own vehicle VH, the offset control unit 150 resumes the offset control with the stationary structural object OJ1 as the control target. At this time, the lateral movement control unit 152 increases the lateral speed of the offset control so that a sufficient distance can be secured between the own vehicle VH and the stationary structure OJ1 prior to the own vehicle VH reaching the stationary structure OJ1.

Figure 5D:
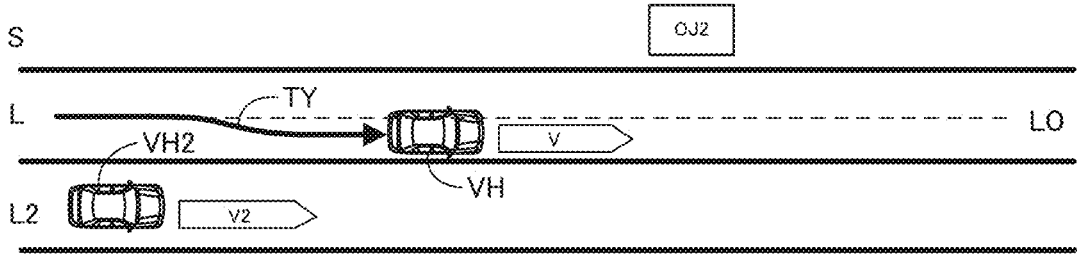
FIG. 5D is a schematic diagram for explaining an example of the offset control according to the present embodiment.

FIG. 5D shows an example of a case in which the right following vehicle VH2, which has a faster vehicle speed than the own vehicle VH, is detected and the relationship between the right following vehicle VH2 and the own vehicle VH satisfies the cancellation condition while the offset control is being executed against to a stationary structure OJ2 with a relatively short distance on the shoulder S adjacent to the left side of the own lane L. Examples of such the stationary structural OJ2 include parked vehicles of the road shoulder S and pylons installed in the short section.

Figure 5E:
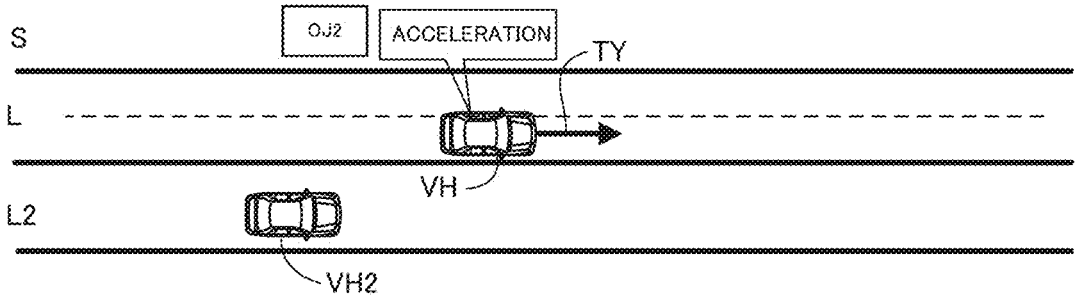
FIG. 5E is a schematic diagram for explaining an example of the offset control according to the present embodiment.
Figure 5F:
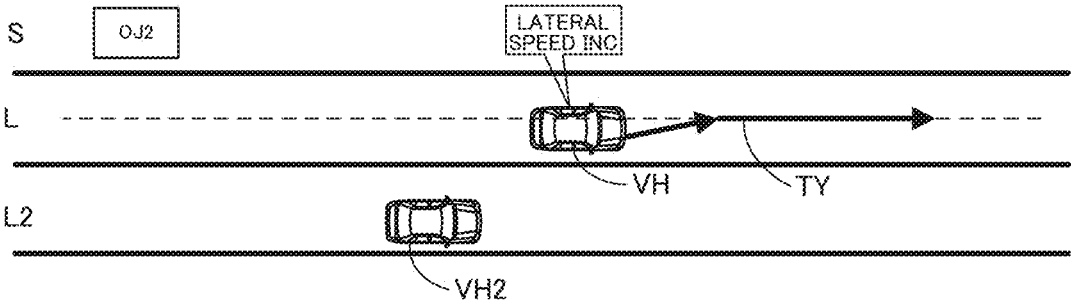
FIG. 5F is a schematic diagram for explaining an example of the offset control according to the present embodiment.

When the longitudinal distance of the stationary structural OJ2 is relatively short, the longitudinal movement control unit 151 determines that the offset continuation allowable condition is satisfied. In this case, as shown in FIG. 5E, the offset control unit 150 continues the offset control. At this time, the longitudinal motion control unit 151 accelerates the own vehicle VH so as to overtake the stationary structural OJ2 prior to the own vehicle VH catching up by the right following vehicle VH2. As shown in FIG. 5F, when the own vehicle VH overtakes the stationary structural OJ2, the offset control unit 150 returns the lateral position of the own vehicle VH to the center L0 of the own lane L. At this time, the lateral movement control unit 152 increases the lateral speed of the offset control so that the own vehicle VH can return to the center L0 of the own lane L prior to being overtaken by the right following vehicle VH2.

Figure 6A:
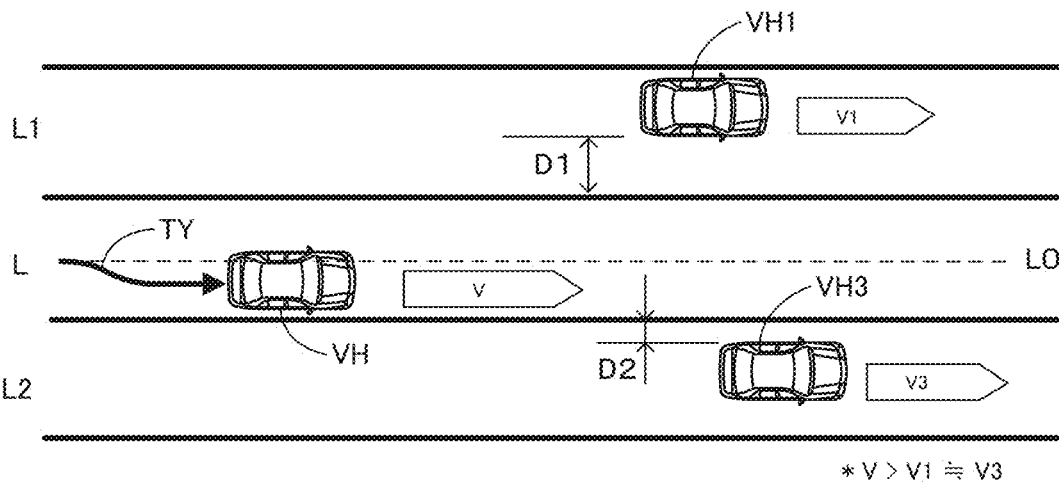
FIG. 6A is a schematic diagram for explaining an example of the offset control according to the present embodiment.
Figure 6B:
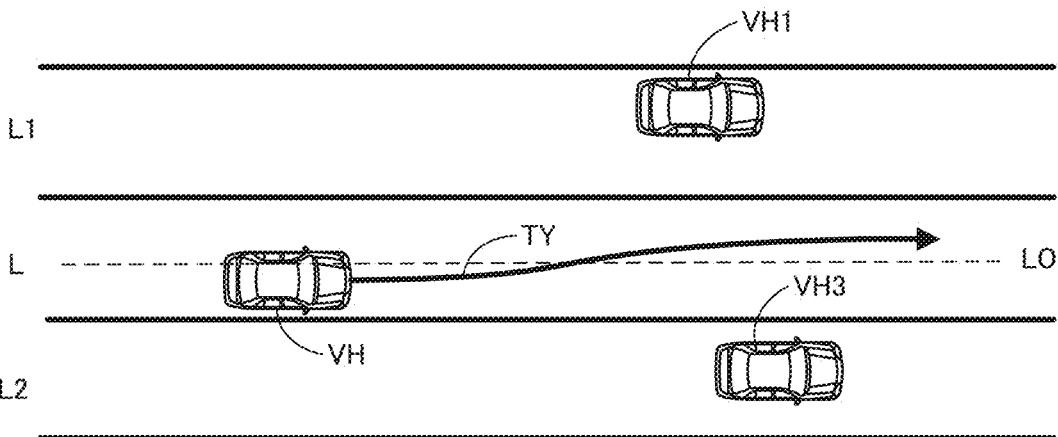
FIG. 6B is a schematic diagram for explaining an example of the offset control according to the present embodiment.

FIGS. 6A and 6B shows an example of a case in which a right preceding vehicle VH3, which is slower than the left preceding vehicle VH1 and runs roughly parallel to the left preceding vehicle VH1, is detected while the offset is being executed with the left preceding vehicle VH1, which has a slower vehicle speed than the left preceding vehicle VH, as the control target. That is, the vehicle speed V of the own vehicle VH is faster than the vehicle speed V1 of the left preceding vehicle VH1 and the vehicle speed V3 of the right preceding vehicle VH3, but the vehicle speed V1 of the left preceding vehicle VH1 and the vehicle speed V3 of the right preceding vehicle VH3 are substantially equal (V>V1≈V3). In such a situation, even if the longitudinal speed or the lateral speed is adjusted, there is a high possibility that a sufficient distance cannot be secured between one of the vehicles when the own vehicle VH overtakes the left preceding vehicle VH1 or the right preceding vehicle VH3.

In such cases, the lateral movement control unit 152 first acquires the first lateral distance D1, which is the distance from the boundary line between the own lane L and the left adjacent lane L1 to the left preceding vehicle VH1, and the second lateral distance D2, which is the distance from the boundary line between the own lane L1 and the right adjacent lane L2 to the right preceding vehicle VH3. If any of these lateral distance D1 and D2 can be acquired, the lateral movement control unit 152 generates a path plan in which the own vehicle VH can overtake the left preceding vehicle VH1 and the right preceding vehicle VH3 while passing through the intermediate position between the left preceding vehicle VH1 and the right preceding vehicle VH3 in the own lane L.

In the embodiment shown in the FIG. 6A, the first lateral distance D1 is larger than the second lateral distance D2 (D1>D2). In such cases, as shown in the FIG. 6B, the lateral movement control unit 152 generates a path plan in which the lateral position of the own vehicle VH is offset to the left adjacent lane L1 of the center L0 of the own lane L. On the other hand, when none of the lateral distance D1 and D2 can be acquired, the lateral movement control unit 152 cannot generate a path plan. In this case, the offset control unit 150 cancels the offset control.

Note that, in the example shown in FIGS. 6A and 6B, the case where the left preceding vehicle VH1 and the right preceding vehicle VH3 whose vehicle speed is slower than that of the own vehicle VH are detected as the approaching objects has been described, but the same processing is performed in the case where either one or both of the approaching objects are stationary structures, and thus the description thereof will be omitted.

Figure 7:
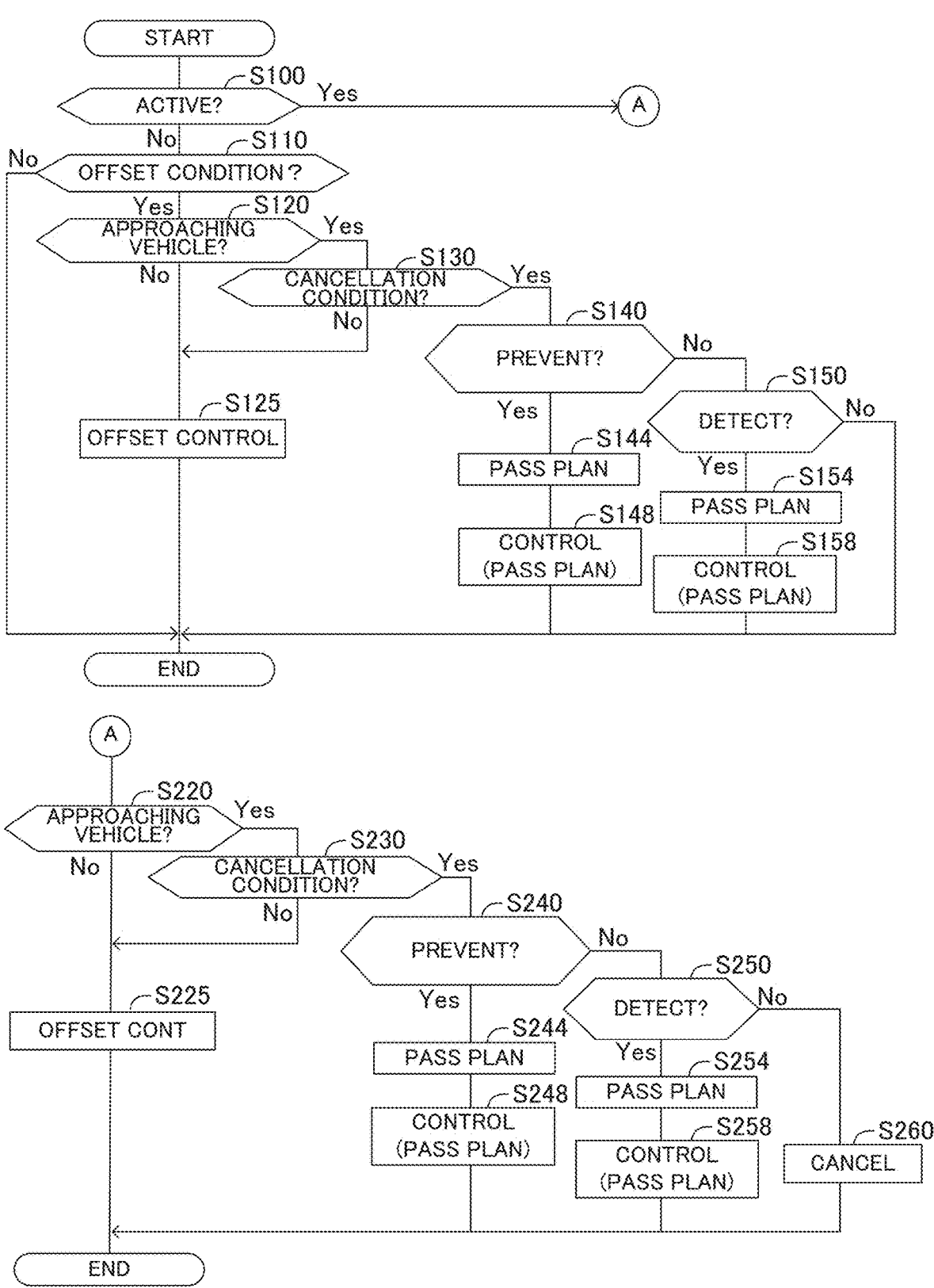
FIG. 7 is a flow chart for explaining a routine of the offset control process.

Next, a routine of the offset control process by the CPU 11 of the ECU 10 will be described with reference to FIG. 7. This routine is started, for example, when the LTA is activated.

In step S100, the ECU 10 determines whether or not the offset control is active. If the offset control is not activated (No), the ECU 10 advances the process to step S110. On the other hand, if the offset control is activated (Yes), the ECU 10 advances the process to step S220.

In step S110, the ECU 10 determines whether or not the offset condition is satisfied. If the offset condition is satisfied (Yes), the ECU 10 advances the process to step S120. On the other hand, if the offset condition is not satisfied (No), the ECU 10 returns this routine.

In step S120, the ECU 10 determines whether an approaching vehicle that approaches to the own vehicle VH in the adjacent lane L2 from the behind of the own vehicle VH is detected. If the approaching vehicle is not detected (No), the ECU 10 advances the process to step S125 and executes the offset control. On the other hand, if the approaching vehicle is detected (Yes), the ECU 10 advances the process to step S130.

In step S130, the ECU 10 determines whether or not the cancellation condition is satisfied. If the cancellation condition is not satisfied (No), the ECU 10 advances the process to step S125 and executes the offset control. On the other hand, if the cancellation condition is satisfied (Yes), the ECU10 advances the process to step S140.

In step S140, the ECU 10 determines whether or not the own vehicle VH can be prevented from becoming a vehicle behavior approaching the preceding vehicle or the stationary structure subject to the offset control by adjusting the longitudinal speed or the lateral speed. If it is determined that it can be prevented (Yes), the ECU 10 advances the process to step S144 and generates the pass plan for adjusting the longitudinal speed and the lateral speed. Next, in step S148, the traveling of the own vehicle VH is controlled based on the pass plan generated in step S144.

On the other hand, if it is determined in step S140 that it cannot be prevented (No), the ECU 10 advances the process to step S150. In step S150, the ECU 10 determines whether or not the first lateral distance D1 of the preceding vehicle or the stationary structural object to be subjected to the offset control and the second lateral distance D2 of the approaching vehicle can be detected. If the first lateral distance D1 and the second lateral distance D2 can be detected (Yes), the ECU 10 advance the proceed to step S154 and generate the path plan based on the first lateral distance D1 and the second lateral distance D2. Next, in step S158, the traveling of the own vehicle VH is controlled based on the pass plan generated in step S154. On the other hand, if the first lateral distance D1 or the second lateral distance D2 cannot be detected in step S150 (No), the ECU 10 terminates the routine without executing the offset control.

In step S220, the ECU 10 determines whether the approaching vehicle that approaches to the own vehicle VH in the adjacent lane L2 is detected. If the approaching vehicle is not detected (No), the ECU 10 advances the process to step S225 and continues offset control. On the other hand, if the approaching vehicle is detected (Yes), the ECU 10 advances the process to step S230.

In step S230, the ECU 10 determines whether or not the cancellation condition is satisfied. If the cancellation condition is not satisfied (No), the ECU 10 advances the process to step S225 and continues the offset control. On the other hand, if the cancellation condition is satisfied (Yes), the ECU 10 advances the process to step S240.

In step S240, the ECU 10 determines whether or not the own vehicle VH can be prevented from becoming a vehicle behavior approaching the preceding vehicle or the stationary structure subject to the offset control by adjusting the longitudinal speed or the lateral speed. If it is determined that it can be prevented (Yes), the ECU 10 advances the process to step S244 and generates the pass plan for adjusting the longitudinal speed and the lateral speed. Next, in step S248, the traveling of the own vehicle VH is controlled based on the pass plan generated in step S244.

On the other hand, if it is determined in step S240 that it cannot be prevented (No), the ECU 10 advances the process to step S250. In step S250, the ECU 10 determines whether or not the first lateral distance D1 of the preceding vehicle or the stationary structural object to be subjected to the offset control and the second lateral distance D2 of the approaching vehicle can be detected. If the first lateral distance D1 and the second lateral distance D2 can be detected (Yes), the ECU 10 advance the proceed to step S254 and generate the path plan based on the first lateral distance D1 and the second lateral distance D2. Next, in step S258, the traveling of the own vehicle VH is controlled based on the pass plan generated in step S254. On the other hand, if the first lateral distance D1 or the second lateral distance D2 cannot be detected in step S250 (No), the ECU 10 advances the process to S260 and cancels the offset control, and then terminates this routine.

In the above, the vehicle control device and the vehicle control method according to the at least one embodiment have been described, but the present disclosure is not limited to the above-mentioned at least one embodiment, and various modifications are possible within the range not departing from the object of the present disclosure. The application of the present disclosure can also be applied to the vehicle that automatically performs some or all of the driving operations.

What is claimed is:

1. A vehicle control device configured to control travel of an own vehicle so that a lateral position of the own vehicle is maintained at a predetermined target lateral position set in an own lane, comprising:

an electronic control unit (ECU) having one or more processors and a memory storing instructions that, when executed by the processors, cause the ECU to:

execute longitudinal control, when a leading vehicle approaching the own vehicle is detected in an adjacent lane that is on one side of the own lane, and a following vehicle approaching the own vehicle is detected in an adjacent lane that is on an opposite side of the own lane, determine that the leading vehicle has a vehicle speed lower than that of the own vehicle and that the following vehicle has a vehicle speed higher than that of the own vehicle, when the own vehicle is unable to advance a second timing, at which the following vehicle overtakes the own vehicle, to be earlier than a first timing, at which the own vehicle overtakes the leading vehicle, even by accelerating the own vehicle with a predetermined upper-limit acceleration of the own vehicle, decelerate the own vehicle so as to allow the following vehicle to overtake the own vehicle before the own vehicle overtakes the leading vehicle; and after the following vehicle has overtaken the own vehicle, increase a lateral speed of the own vehicle to offset the own vehicle to a target lateral position laterally separated from the leading vehicle before the first timing.

2. The vehicle control device according to claim 1, wherein, when the own vehicle is able to advance the second timing to be earlier than the first timing by accelerating the own vehicle with an acceleration equal to or lower than the predetermined upper-limit acceleration, the longitudinal control accelerates the own vehicle so that the own vehicle overtakes the leading vehicle before the following vehicle overtakes the own vehicle; and wherein, after the own vehicle has overtaken the leading vehicle, the lateral control increases the lateral speed of the own vehicle to return the own vehicle toward a center of the own lane before the second timing.

*　*　*　*　*